July 28, 1959 — C. A. HALLAM — 2,896,777
DIFFERENTIAL DRIVE APPARATUS
Filed June 13, 1957
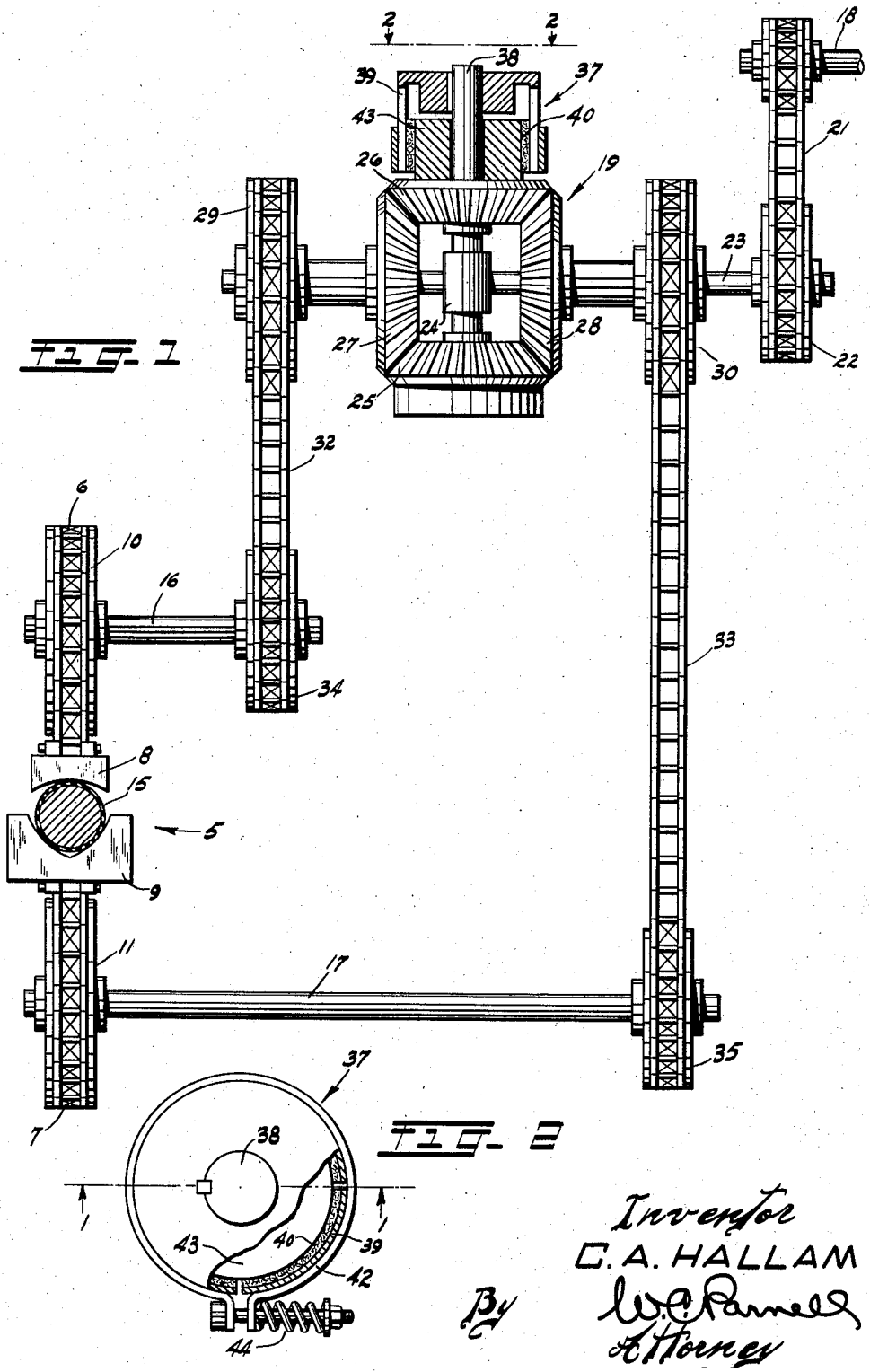
Inventor
C. A. HALLAM

United States Patent Office 2,896,777
Patented July 28, 1959

2,896,777

DIFFERENTIAL DRIVE APPARATUS

Cecil A. Hallam, Westfield, N.J., assignor to Western Electric Company, Incorporated, New York, N.Y., a corporation of New York Application June 13, 1957, Serial No. 665,405

2 Claims. (Cl. 203—227)

This invention relates to an improvement in differential drive apparatus and particularly to differential driven article advancing apparatus having at least two driving members cooperating to exert a pulling force on elongated articles.

In the material handling arts, particularly those pertaining to the advancing of strand-like materials longitudinally of themselves, various types of capstans are utilized. One type, generally known in the art as a tractor capstan, employs a pair of endless belts or chains, portions of which run parallel to each other on opposite sides of a segment of the strand-like material to be moved. These chains are provided with suitable tractor blocks or other means to grip and carry along or move the material, a camming arrangement being utilized to force or press the blocks into gripping or friction engagement with the material. A tractor capstan of this type is disclosed in Patent 2,251,291 to L. O. Reichelt. The pitch of the links of the two opposing chains and the corresponding drive sprockets therefor are made substantially identical so they may be geared together and be driven from a single power source to move the advancing members at the same speeds. Alternately they may be driven through a differential, the differential making it possible to equalize the chain speeds and the pulls exerted thereby regardless of slight differences in sprocket diameter or in the pitch of the chain links which may result from wear and stretch.

Normally the differential drive arrangement functions satisfactorily to equalize the pulling forces exerted by the chains or advancing members, however, in the event the coefficient of friction between one of the advancing members and the strand-like article is reduced, or its friction drag is lowered, as may result with grease or oil being spilled thereon, one of the advancing members may start to slip and its pulling force on the material is then correspondingly decreased. Due to the differential action, the pulling force of the other advancing member is automatically reduced to equal that of the slipping one, the action being similar to that of the differential of an automobile when one wheel starts slipping. Thus, for such a slipping condition, the pulling force of the member having the higher coefficient of friction is reduced to the same value as that on the other having the lower coefficient of friction. In cases where high pulling forces (i.e., 1,000 pounds) are required to pull relatively slippery articles, such as steel sheathed cables, through processing equipment, the correspondingly high friction drag of the capstan advancing members on the cable has been obtained by increasing the forces normal to the cable. In practice these forces may be so large that the cable is squashed and damaged.

One object of this invention is to minimize the change in pull exerted on an article being advanced by such a differential drive arrangement, when slippage occurs in one of the pulling members, in order that variations in the velocity of the advancing member may be correspondingly minimized.

Another object of the invention is to minimize the effect of slippage in one differential driven member on the other driven member.

Still another object is to permit the one of two differential driven members having the greater friction drag with the advanced article to exert a greater pulling force on the advanced article than is exerted by the other driven member when said other member starts to slip.

In accordance with the foregoing objects, applicant applies a braking force to the differential mechanism of a drive system such that in effect a force is applied to the slipping driven member in one output of the differential which is reflected in the other output so that an additional pulling force is made available to the non-slipping driven member, thereby increasing its pulling power over that of the slipping member.

In a preferred embodiment of the invention as applied to a tractor capstan drive system for advancing a cable in which the output gears of a differential are connected to the cable advancing members of the capstan, a brake on the planetary gearing of the differential provides a drag or resistance to rotation of the planetary gearing on their own axes. Then when one of the advancing members slips on the cable, the non-slipping advancing member will deliver a pull on the cable which is equal to the sum of the pull of the slipping member plus a pull corresponding to the friction of the brake on the planetary gearing. Since this arrangement makes it possible for the non-slipping member to exert a greater pulling force on the cable than would be possible otherwise, the forces applied normal to the cable may be held to a safe minimum value. Another advantage of this arrangement is that there is substantially no drag or wasted energy due to slippage of the brake until one of the article advancing members starts slipping.

These and other features of the invention will be more fully understood from the following detailed description when taken in conjunction with the accompanying drawing, in which:

Fig. 1 is a schematic diagram of differential drive system for a tractor capstan constructed in accordance with the invention, the brake being shown in section as seen along the plane of line 1—1 of Fig. 2, and Fig. 2 is a broken view of the brake for the differential, as seen along the plane of line 2—2 of Fig. 1.

In the drawing a tractor capstan 5 is shown in end elevation with two material advancing members 6 and 7 comprising sprocket chains with resilient tractor or gripping blocks 8 and 9 attached thereto. While the blocks are attached to successive portions of the full lengths of the chains, only one pair of blocks is disclosed in order that the chains 6 and 7 and drive sprockets 10 and 11 therefor might be shown in this schematic diagram. Opposing portions of the chains with the blocks 8 and 9 facing one another extend parallel to a cable 15, or any other strand-like material to be advanced, therebetween, means (not shown) being provided to urge the blocks into gripping engagement with the cable 15. Specific capstan structure is disclosed in the aforementioned patent.

Drive shafts 16 and 17 for the sprockets 10 and 11 are driven in opposite directions from a main drive shaft or source of power 18 through a differential gearing device 19. Power is supplied from the shaft 18 through a chain drive 21 to a sprocket 22 on the input shaft 23 of the differential 19. The shaft 23 rotates a spider member 24 for planetary gears 25 and 26. The planetary gears mesh with a pair of output gears 27 and 28 which in turn drive sprockets 29 and 30, respectively. Sprocket chains 32 and 33 connect sprockets 34 and 35 on the drive shafts 16 and 17 with the output sprockets 29 and 30, respectively.

Sprockets 29, 30, 34 and 35 are all the same size so that the shafts 16 and 17 are normally driven at the same speeds and, due to the use of similar sprockets and chains in the capstan, the linear driven speeds of the two chains 6 and 7 should be substantially identical.

So long as there is no slip between the tractor chains and the cable 15 there is substantially no differential action and the pulling force exerted by each chain on the cable is the same. For example, the force for pulling a large cable through a sheathing line may range between 600 to 1,000 pounds which is divided equally between the two driven chains. A brake 37 is provided on the differential to keep it from performing as a differential until necessary, as discussed below. This braking structure includes an extension of the spider 24 having a shaft portion 38 and a cup-shaped slitted portion 39, both fixed with respect to the rotatable planetary gear 26. A brake lining 40 on the internal cylindrical surfaces of portion 39 is held, by clamp 42, in friction engagement with the outer surface of a cylindrical member 43 affixed to and rotatable with the planetary gear 26. The drag of the brake may be changed by tightening or loosening the bolt 44 for the clamp.

In the event the pulling force applied to one of the chains exceeds the friction drag between it and the cable, slip will occur and, if not for the brake 37 on the differential, the pull on the non-slipping chain would, through differential action, be reduced to that of the slipping chain.

The function of brake 37 is to exert a braking force on the planetary gears 26 and 25 to prevent their free rotation on their own axes. Normally then, both sides or outputs of the differential will be driven at the same speeds as if the differential were a straight drive, the pull on the one side being independent of the pull of the other. The brake will not slip, that is, differential action will not commence until the difference in pull exerted by the two cable advancing chains overcomes the friction of the brake. In any case the pull on the non-slipping chain will never be less than the sum of the pull of the slipping chain plus a pull corresponding to the drag of the brake.

In the event there is no slippage (i.e., with high coefficients of friction) then the chains should be driven at identical speeds. Since it is not possible to exactly match the chains, due to slight wear and stretch variations, the differential must be permitted to operate in order that cumulatively built up stresses, resulting from these variations, may be relieved before the gears, chains or sprockets are damaged. The brake then is set to slip before such dangerous stresses may be built up.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a system for advancing an elongated article, a tractor capstan having opposing article contacting members for advancing the article and a differential gearing device having a pair of output gears, planetary gears meshed with the output gears and an input spider member for spinning the planetary gears to drive the output gears, a source of power for driving the input member, and means connecting each of the output gears to corresponding ones of said opposing members, of a brake for resisting the rotation of the planetary gears on the spider comprising an extension on the spider and movable therewith and fixed with respect to the rotatable planetary gears, a cylindrical portion on the extension with axially extending slots dividing said portion into a plurality of segments, friction braking surfaces on the inner surfaces of the segments, a cylindrical member positioned within the cylindrical portion and affixed to and rotatable with one of the planetary gears, and a clamping member encircling the slotted cylindrical portion for holding the braking surfaces in friction engagement with the cylindrical member.

2. In a system for advancing an elongated article, a tractor capstan having opposing article contacting members for advancing the article and a differential gearing device having a pair of output gears, planetary gears meshed with the output gears and an input spider member for spinning the planetary gears to drive the output gears, a source of power for driving the input member, and means connecting each of the output gears to corresponding ones of said opposing members, of a brake for resisting the rotation of the planetary gears on the spider comprising an extension on the spider and movable therewith and fixed with respect to the rotatable planetary gears, a cylindrical portion on the extension with axially extending slots dividing said portion into a plurality of segments, friction braking surfaces on the inner surfaces of the segments, a cylindrical member positioned within the cylindrical portion and affixed to and rotatable with one of the planetary gears, and a clamp having an elongated member formed slightly less than 360 degrees around the cylindrical portion with the ends thereof extending outwardly from said portion, and an adjustable resilient element interconnecting the ends for exerting a force to pull the ends toward each other for applying a compressive force to the segmented cylindrical portion to force the braking surfaces into friction engagement with the cylindrical member.

References Cited in the file of this patent

UNITED STATES PATENTS

| | | |
|---|---|---|
| 671,828 | King | Apr. 9, 1901 |
| 895,202 | Ross | Aug. 4, 1908 |
| 1,066,958 | Stoddard | July 8, 1913 |
| 1,838,380 | Fraser | Dec. 29, 1931 |

FOREIGN PATENTS

| | | |
|---|---|---|
| 276,789 | Germany | of 1914 |